United States Patent
Zhu et al.

(10) Patent No.: US 11,031,828 B2
(45) Date of Patent: Jun. 8, 2021

(54) METHOD AND APPARATUS FOR RECEIVING AND TRANSMITTING DATA INFORMATION

(71) Applicant: Lenovo (Beijing) Co., Ltd., Beijing (CN)

(72) Inventors: Chong Zhu, Beijing (CN); Fenglong He, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 81 days.

(21) Appl. No.: 16/375,663

(22) Filed: Apr. 4, 2019

(65) Prior Publication Data

US 2019/0312470 A1 Oct. 10, 2019

(30) Foreign Application Priority Data

Apr. 4, 2018 (CN) .......................... 201810300219.1

(51) Int. Cl.
*H02J 50/80* (2016.01)
*H02J 50/90* (2016.01)

(52) U.S. Cl.
CPC .............. *H02J 50/80* (2016.02); *H02J 50/90* (2016.02)

(58) Field of Classification Search
CPC ................................. H02J 50/80; H02J 50/90
USPC ......................................................... 307/104
See application file for complete search history.

(56) References Cited

U.S. PATENT DOCUMENTS

| 2008/0258679 A1* | 10/2008 | Manico | H02J 7/025 320/106 |
| 2009/0198852 A1* | 8/2009 | Rofougaran | H04M 1/72527 710/300 |
| 2016/0157047 A1 | 6/2016 | Zhen et al. | |

FOREIGN PATENT DOCUMENTS

| CN | 104253881 A | 12/2014 |
| CN | 104270731 A | 1/2015 |
| CN | 106303936 A | 1/2017 |
| CN | 106569553 A | 4/2017 |
| CN | 107249079 A | 10/2017 |
| CN | 107295492 A | 10/2017 |
| CN | 107613155 A | 1/2018 |

* cited by examiner

*Primary Examiner* — Tomi Skibinski

(74) *Attorney, Agent, or Firm* — Anova Law Group, PLLC

(57) ABSTRACT

Methods and terminals for receiving and transmitting data information are provided. The method for receiving data information includes: determining whether information of a wireless power receiving module of a mobile terminal, obtained within a power transmission range by a wireless power transmitting module, satisfies a preset condition; and in response to the information of the wireless power receiving module satisfying the preset condition, performing a preset function of the mobile terminal. The preset function includes receiving and outputting a prompt message that is originally supposed to be outputted on the mobile terminal.

10 Claims, 2 Drawing Sheets

METHOD AND APPARATUS FOR RECEIVING AND TRANSMITTING DATA INFORMATION

CROSS-REFERENCES TO RELATED APPLICATIONS

This application claims the priority of Chinese Patent Application No. 201810300219.1, filed on Apr. 4, 2018, the entire contents of which are incorporated herein by reference.

FIELD OF THE DISCLOSURE

The present disclosure generally relates to the field of wireless charging and, more particularly, relates to methods and terminals for receiving and transmitting data information.

BACKGROUND

Nowadays, it is common for a user to simultaneously use multiple electronic devices such as a computer, a mobile phone, and a wearable device.

When a user participates in a video conference and intends not to disturb other people in an office, the user may often wear a headphone to attend the video conference in front of a computer. At this time, to take an incoming call, the user may turn down the volume of the computer and switch the headphones to the mobile phone. After the call ends, the user may switch the headphone back to the computer and continue to attend the video conference.

Switching the headphone back and forth substantially degrades the user experience with the electronic devices.

The disclosed methods and terminals for receiving and transmitting data information are directed to solve one or more problems set forth above and other problems in the art.

BRIEF SUMMARY OF THE DISCLOSURE

One aspect of the present disclosure provides a method, including: determining whether information of a wireless power receiving module of a mobile terminal, obtained within a power transmission range by a wireless power transmitting module, satisfies a preset condition; and in response to the information of the wireless power receiving module satisfying the preset condition, performing a preset function of the mobile terminal. The preset function includes receiving and outputting a prompt message that is originally supposed to be outputted on the mobile terminal.

Another aspect of the present disclosure provides a terminal, including: a wireless power transmitting module. The terminal is configured for determining whether information of a wireless power receiving module of a mobile terminal, obtained within a power transmission range by the wireless power transmitting module, satisfies a preset condition; and in response to the information of the wireless power receiving module satisfying the preset function, performing a preset function of the mobile terminal. The preset function includes receiving and outputting a prompt message that is originally supposed to be outputted on the mobile terminal.

Another aspect of the present disclosure provides a method, including: obtaining, within a power transmission range, by a wireless power receiving module of a mobile terminal, information of a wireless power transmitting module of a terminal, and performing, by the mobile terminal, a preset function, in response to the information of the wireless power transmitting module of the terminal obtained with the power transmission range by the wireless power receiving module unsatisfying a present condition, or in response to the wireless power transmitting module of the terminal is out of the power transmission range. In response to the information of the wireless power transmitting module of the terminal satisfying the preset condition, the terminal performs the preset function. The preset function includes that the terminal receives and outputs a prompt message that is originally supposed to be outputted on the mobile terminal.

Other aspects of the present disclosure can be understood by those skilled in the art in light of the description, the claims, and the drawings of the present disclosure.

BRIEF DESCRIPTION OF THE DRAWINGS

To more clearly illustrate the technical solution in the present disclosure, the accompanying drawings used in the description of the disclosed embodiments are briefly described hereinafter. Obviously, the drawings described below are merely some embodiments of the present disclosure. Other drawings may be derived from such drawings by a person with ordinary skill in the art without creative efforts and may be encompassed in the present disclosure.

DETAILED DESCRIPTION

To make the foregoing objectives, features and advantages of the present disclosure clearer and more understandable, the present disclosure will be further described with reference to the accompanying drawings and embodiments. However, exemplary embodiments may be embodied in various forms and should not be construed as limited to the embodiments set forth herein. Rather, these embodiments are provided to fully convey the thorough and complete concepts of the exemplary embodiments to those skilled in the art.

Currently, many terminals, such as desktop computers, notebook computers, and all-in-one computers, include wireless power transmitting module. Many other terminals, such as tablet computers and PDAs, include wireless power receiving module. A notebook computer may include a wireless power transmitting module and a wireless power receiving module. When the notebook computer is powered by AC mains, the notebook computer may become a wireless power transmitter. When the notebook computer is powered by batteries, the notebook computer may become a wireless power receiver.

Some devices are purely wireless charging devices. For example, a base of the all-in-one computer may be connected to an external wireless charging device. The external wireless charging device may be connected through a USB interface for charging mobile phones and other mobile devices. The present disclosure provides a method for receiving transmitting data information. The present disclosure also provides an apparatus for receiving data information. The present disclosure also provides a method for transmitting data information. The present disclosure also provides an apparatus for transmitting data information. Detailed description will be provided for each of the methods and apparatuses in the following embodiments of the present disclosure.

The present disclosure provides a method for receiving data information. The method is described in detail in the following embodiments.

Figure 1:
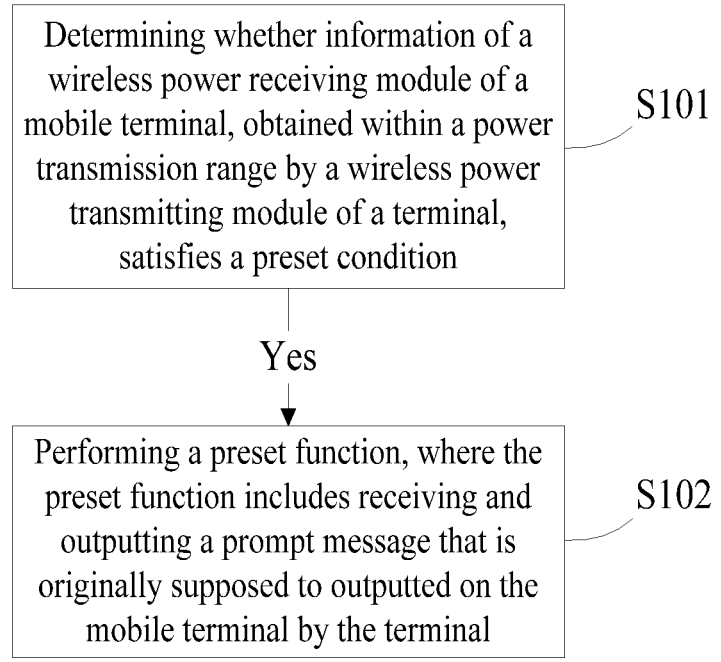
FIG. 1 illustrates a flow chart of an example of a method of receiving data information according to some embodiments of the present disclosure.

FIG. 1 illustrates a flow chart of an example of a method of receiving data information according to some embodiments of the present disclosure. In one embodiment, a notebook computer is powered by AC mains. As shown in FIG. 1, the method for receiving data information may include the following process.

A wireless power transmitting module obtains information of a wireless power receiving module of a mobile terminal within a power transmission range and determines whether the information satisfies a preset condition (S101).

Wireless charging technology originates from wireless electrical energy transmission technology. The wireless power transmitting module of a charging device transfers electrical energy through an electromagnetic field to the wireless power receiving module of a power consuming device without an electrical wire connection. For example, the wireless power transmitting module of the charging device transfers the electrical energy through the electromagnetic field to the wireless power receiving module of a mobile phone. The wireless power receiving module of the mobile phone converts the electromagnetic field into the electrical energy to charge a battery.

The power transmission range refers to a distance range that the wireless power receiving module can receive the electrical energy transmitted by the wireless power transmitting module.

The information of the wireless power receiving module of the mobile terminal refers to radio frequency information of the wireless power receiving module of the mobile terminal.

The preset condition refers to a condition that a terminal achieves a design objective thereof. The preset condition may include a signal intensity and a connection status. The connection status may include a status at the beginning of charging, a status during charging, and a status at the end of charging.

The determining of whether the information of the wireless power receiving module of the mobile terminal, obtained within the power transmission range by the wireless power transmitting module, satisfies the preset condition may include determining whether, within the power transmission range that the wireless power receiving module can receive the electrical energy transmitted by the wireless power transmitting module, the wireless power transmitting module of the terminal obtains the information of the wireless power receiving module of the mobile terminal, and whether the information satisfies the preset condition.

For example, within the power transmission range that the wireless power receiving module of a mobile phone can receive the electrical energy transmitted by the wireless power transmitting module of a notebook computer, whether the wireless power transmitting module of the notebook computer obtains the information of the wireless power receiving module of the mobile phone, that satisfies the preset condition, is determined. That is, charging information that the notebook computer charges the mobile phone is obtained. Further, a programming process of the notebook computer determines whether the signal intensity of the charging information satisfies a first preset condition and whether the connection status of the charging information satisfies a second preset condition.

In response to the signal intensity of the charging information satisfying the first preset condition and the connection status of the charging information satisfying the second preset condition, a preset function may be performed (S102). The preset function may include receiving and outputting a prompt message that is originally supposed to be outputted on the mobile terminal.

Performing the preset function that is originally performed on the mobile terminal by the terminal is the objective of S102. In response to the mobile terminal entering the power transmission range and the preset condition being satisfied, the function that is originally performed on the mobile terminal may be automatically transferred to the terminal and may be performed by the terminal. In response to the mobile terminal leaving the power transmission range or in response to the preset condition not being satisfied, the function that is originally performed on the mobile terminal may still be performed by the mobile terminal.

For example, the mobile phone enters the power transmission range of the notebook computer and the preset condition is satisfied, the notebook computer may perform the preset function. The preset function may include launching an application that corresponds to a first preset function of the mobile terminal (S102-1) and establishing a communication connection to the mobile terminal according to a preset communication method (S102-1-1).

A communication method refers to a communication connection method for exchanging data information between two devices and often includes a wireless communication method or a wireline communication method.

The preset communication method refers to a communication connection method between the terminal and the mobile terminal, that is preset prior to performing the preset function. For example, the most convenient communication method between the mobile phone and the notebook computer may be the wireless communication method, such as a Bluetooth communication method, a Wi-Fi communication method, and an infrared communication method, etc.

In one embodiment, because the communication method for exchanging data information is subject to a security risk, the terminal may establish the communication connection to the mobile terminal according to a preset secured communication method. For example, to avoid loss of data when exchanging data information between the mobile phone and the notebook computer, a handshaking method and/or a data verification method may be used to ensure data security. To prevent external intrusion, secure authentication may be used when establishing the communication connection.

The communication connection may be used to receive and output data information transmitted by the mobile terminal and related to the preset function (S102-1-2).

In particular, the communication connection may be used to receive packetized information transmitted by the mobile terminal and related to the preset function (S102-1-2-1).

A packet is a unit of data in network communication transmission and is often referred to a data packet. Packetization refers to encapsulating data to be transmitted into a packet. The purpose of the packetization is to divide data into fragments for transmission to avoid excessive transmission delay caused by excessively large data or re-transmission caused by data transmission failures in case of poor network conditions. To increase transmission efficiency, data may often be packetized. Data packetization may include at least one of data fragmentation, data compression, or data encryption.

The data fragmentation often refers to that in a communication process, when an application layer transfers a large amount of data to a transport layer, the transport layer may divide the large amount of the data into fragments that are more suitable for transmission in order to avoid degradation of the transmission efficiency caused by network environment.

The data compression refers to that under the premise of not losing any useful information, the amount of data may be reduced to save storage and increase efficiency of transmission, storage and processing. Optionally, the data compression may refer to a technical solution to re-organize the data according to a certain algorithm to reduce redundancy and storage space of the data.

The data encryption refers to a process of using an encryption algorithm and an encryption key to convert a plain text into an encrypted text, and data decryption refers to a process of using a decryption algorithm and a decryption key to convert the encrypted text to the plain text.

The transmitting of the packetized information related to the preset function by the mobile terminal refers to packetizing and transmitting data information that is used when the mobile terminal originally performs the preset function to the terminal, which receives the packetized data information. For example, according to a preset packetization method, the mobile phone may fragment, compress and encrypt the data information required by the notebook computer in performing the preset function, and may generate and transmit the packetized information to the notebook computer.

The packetized information is restored to original data information according to a preset depacketization method (S102-1-2-2).

Depacketization is a reverse process of packetization. Depacketization may include at least one of data reconstruction, data decompression, or data decryption.

A preset decryption method corresponds to a preset encryption method. Generally, the data fragmentation corresponds to the data reconstruction, the data compression corresponds to the data decompression, and the data encryption corresponds to the data decryption.

The original data information refers to the data information prior to the packetization by the mobile terminal. The restoring of the packetized data information to the original data information refers to restoring the packetized information to the data information prior to the packetization by the mobile terminal. For example, after the notebook computer receives the packetized information transmitted by the mobile phone, the notebook computer may decrypt, decompress and reconstruct the packetized information according to the preset depacketization method to restore the packetized data to the original data prior to the packetization by the mobile terminal.

In response to the information, obtained within the power transmission range by the wireless power transmitting module from the wireless power receiving module of the mobile phone unsatisfying the preset condition or in response to the wireless power receiving module of the mobile terminal being out of the power transmission range, the performing of the preset function may be stopped while allowing the mobile terminal to receive and output the prompt message (S103).

For example, in response to the mobile phone entering a preset power transmission range of the notebook computer and the preset condition being satisfied, the notebook computer may perform the preset function that is originally supposed to be performed on the mobile phone. In response to the mobile phone being in a direction of wireless charging, but the signal intensity or the connection status unsatisfying the preset condition, or in response to the mobile phone being out of the power transmission range, the mobile phone may no longer transmit the information to the notebook computer. That is, the notebook computer no longer performs the preset function and the mobile terminal automatically performs the preset function.

In one embodiment, the original data information includes original streaming media information.

The audio and video data may be transmitted in the form of audio streams and video streams, collectively referred to as streaming media. The streaming media information may include voice information and/or video information.

When the preset function is a telephone function of the mobile terminal, for example, a call function of the mobile phone, the streaming media information refers to the voice information.

The method of receiving data information may further include playing voice information through a voice player module (S103).

For example, after the mobile phone receives the voice information, the mobile phone may packetize the voice information and transmit the packetized voice information to the notebook computer. After the notebook computer receives the packetized voice information, the notebook computer may restore the packetized information to the original voice information according to a preset depacketization method. Then, the speaker of the notebook computer may play the voice information.

The method of receiving data information may further include a voice collection process (S104). In particular, the voice collection process may include collecting voice information through a voice collection module (S104-1), packetizing the voice information into packetized information according to the preset packetization method (S104-2), and using the communication connection to transmit the packetized information to the mobile terminal (S104-3).

For example, the notebook computer may collect the voice information through a microphone. After the notebook computer packetizes the voice information according to the preset packetization method, the notebook computer may transmit the packetized information to the mobile phone. The mobile phone may restore the packetized information to the original voice information according to the preset depacketization method. The original voice information may be transferred to a telephone call receiver according to certain protocol format of mobile communication.

The present disclosure also provides a terminal. Because the terminal adopts similar method of receiving data information as previously described in the embodiments of the present disclosure, the description of the terminal will be streamlined and may refer to the corresponding description of the previously disclosed embodiments for related parts. The embodiments of the terminal described below are intended to be merely illustrative.

Figure 2:
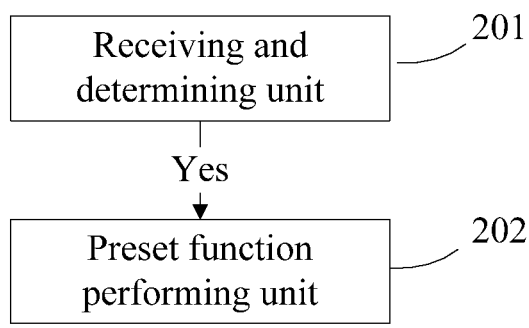
FIG. 2 illustrates a block diagram of an example of a terminal for receiving data information according to some embodiments of the present disclosure.

FIG. 2 illustrates a block diagram of an example of a terminal for receiving data information according to some embodiments of the present disclosure. As shown in FIG. 2, the present disclosure provides a terminal for receiving data information. The terminal may include a receiving and determining unit 201 and a preset function performing unit 202.

The receiving and determining unit 201 determines whether information of a wireless power receiving module of a mobile terminal, obtained within a power transmission range by a wireless power transmitting module satisfies a preset condition. The preset function performing unit 202 performs a preset function in response to the receiving and determining unit 201 outputting a positive result. The preset function may include receiving and outputting a prompt message that is originally supposed to be outputted on the mobile terminal.

In the receiving and determining unit 201, the information of the wireless power receiving module of the mobile terminal may include radio frequency information of the wireless power receiving module of the mobile terminal. The preset function performing unit 202 may include a corresponding function establishing sub-unit. The corresponding function establishing sub-unit establishes an application corresponding to the preset function of the mobile terminal.

The corresponding function establishing sub-unit may include a connection establishing sub-unit and an associated data receiving sub-unit. The connection establishing sub-unit establishes a communication connection with the mobile terminal according to a preset communication method. The associated data receiving sub-unit uses the communication connection to receive and output data information transmitted by the mobile terminal and related to the preset function.

The connection establishing sub-unit may include a secured communication sub-unit. The secured communication sub-unit establishes a communication connection to the mobile terminal according to a preset secured communication method.

The associated data receiving sub-unit may include a packetized information receiving sub-unit and an information restoring sub-unit. The packetized information receiving sub-unit uses the communication connection to receive packetized information transmitted by the mobile terminal and related to the preset function. The information restoring sub-unit restores the packetized information to original data information according to a preset depacketization method. The original data information may include original streaming media information.

In one embodiment, the apparatus may further include a transferring unit. In response to the information of the wireless power receiving module of the mobile terminal, obtained within the power transmission range by the wireless power transmitting module unsatisfying the preset condition, or in response to the wireless power receiving module of the mobile terminal being out of the power transmission range, the transferring unit may stop performing the preset function such that the mobile terminal receives and outputs the prompt message.

When the preset function is a telephone function of the mobile terminal, for example, a call function of the mobile phone, the streaming media information refers to voice information.

In one embodiment, the terminal may further include a voice information player unit. The voice information player unit plays the voice information through a voice player module.

In one embodiment, the terminal may further include a voice information collection sub-unit, a voice information packetization sub-unit, and a packetized information transmitting sub-unit. The voice information collection sub-unit uses a voice collection module to collect the voice information. The voice information packetization sub-unit packetizes the voice information to packetized information according to a preset packetization method. The packetized information transmitting sub-unit uses a communication connection to transmit the packetized information to the mobile terminal.

The present disclosure also provides a method for transmitting data information. Because the method for transmitting data information is similar to the method of receiving data information as previously described in the embodiments of the present disclosure, the description of the method for transmitting data information will be streamlined and may refer to the corresponding description of the previously disclosed embodiments for related parts. The embodiments of the method for transmitting data information described below are intended to be merely illustrative.

Figure 3:
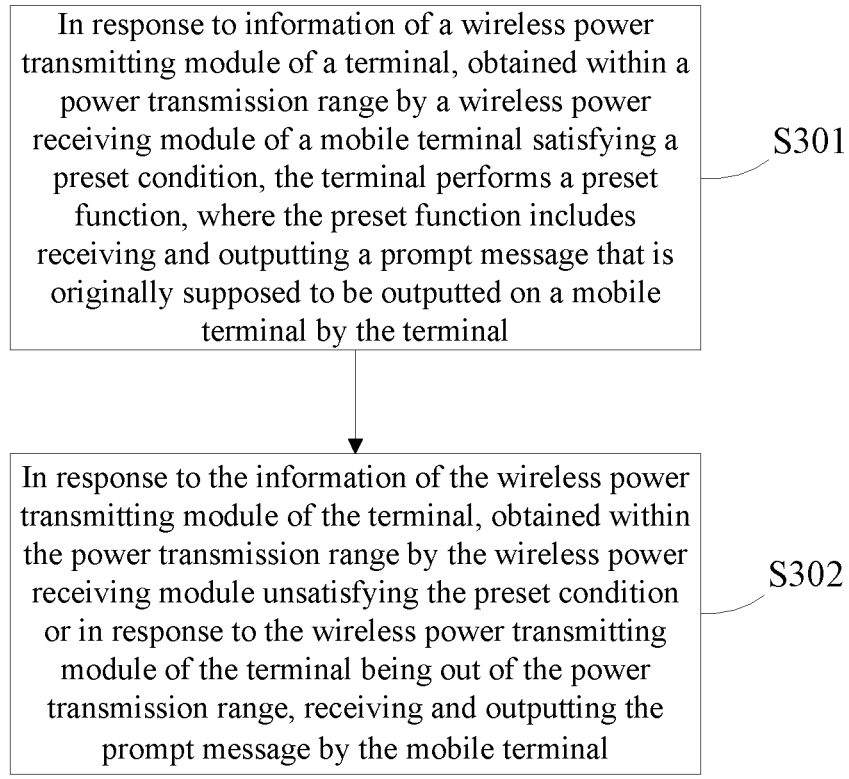
FIG. 3 illustrates a flow chart of an example of a method of transmitting data information according to some embodiments of the present disclosure.

FIG. 3 illustrates a flow chart of an example of a method of transmitting data information according to some embodiments of the present disclosure. As shown in FIG. 3, the present disclosure provides a method for transmitting data information. In some embodiments, a notebook computer may be powered by AC mains.

In response to information of a wireless power transmitting module of a terminal, obtained within a power transmission range by a wireless power receiving module satisfying a preset condition, the terminal may perform a preset function (S301). The preset function may include receiving and outputting a prompt message that is originally supposed to be outputted on a mobile terminal by the terminal.

Performing the preset function that is originally performed on the mobile terminal by the terminal is the objective of S301.

The preset condition refers to a condition that the mobile terminal achieves a design objective thereof. The preset condition may include a signal intensity and a connection status. The connection status may include a status at the beginning of charging, a status during charging, and a status at the end of charging.

Performing the preset function by the terminal may include transferring data information of the preset function to the terminal that performs the preset function.

For example, in response to a mobile phone entering a power transmission range of a notebook computer, whether information of a wireless power transmitting module of the notebook computer, obtained within the power transmission range by a wireless power receiving module of the mobile phone satisfies a preset condition is determined. In response to the information satisfying the preset condition, a preset function that is originally performed by the mobile phone may be automatically transferred and be performed by the notebook computer. In response to the mobile phone leaving the power transmission range of the notebook computer, the preset function may be again performed by the mobile phone.

Further, transferring the data information of the preset function to the terminal may include transferring the data information of the preset function to the terminal according to a preset communication method.

Further, transferring the data information of the preset function to the terminal according to the preset communication method may include establishing a communication connection to the terminal according to the preset communication method (S301-1) and using the communication connection to transmit the data information of the preset function to the terminal (S301-2).

Further, establishing the communication connection to the terminal according to the preset communication method (S301-1) may include establishing a communication connection to the terminal according to a preset secured communication method.

Further, using the communication connection to transmit the data information of the preset function to the terminal (S301-2) may include packetizing the data information of the preset function to packetized information according to a preset packetization method (S301-2-1) and using the communication connection to transmit the packetized information to the terminal (S301-2-2).

The data information of the preset function may include streaming media information received in real-time.

In particular, in response to the mobile terminal transferring a telephone function to the terminal, the streaming media information received in real-time may be voice information generated by answering a telephone call in real-time.

Further, transmitting data information may include a process of transmitting the voice information (S304).

In particular, the process of transmitting the voice information may include receiving the packetized information that the terminal packetizes according to the preset packetization method (S304-1), restoring the packetized information to the original voice information according to a preset depacketization method (S304-2), and transmitting the original voice information to a telephone call receiver according to certain protocol format of mobile communication (S304-3).

The mobile communication is a communication method between a mobile user and a fixed line user or between mobile users. Transmission of the data information of the mobile communication may include transmitting the data information through a mobile network and receiving the data information through the mobile network according to a pre-determined protocol format.

In response to the information of the wireless power transmitting module of the terminal, obtained within the power transmission range by the wireless power receiving module unsatisfying the preset condition or in response to the wireless power transmitting module of the terminal being out of the power transmission range, the mobile terminal may receive and output the prompt message (S302).

For example, the preset function may be the telephone function. In response to the mobile phone being out of the power transmission range of the notebook computer, the mobile phone may perform the telephone function. Or, in response to the mobile phone within the power transmission range of the notebook computer unsatisfying the preset condition, the mobile phone may perform the telephone function.

The telephone function performed by the mobile phone may include the following two functions.

In one function, in response to the telephone call being made by the notebook computer and the mobile phone leaving the power transmission range of the notebook computer or in response to the mobile phone within the power transmission range unsatisfying the preset condition, the telephone call may be automatically transferred to the mobile phone.

In another function, in response to an incoming telephone call ringing the notebook computer and the mobile phone leaving the power transmission range of the notebook computer, the mobile phone may automatically pick up the incoming telephone call.

Further, receiving and outputting the prompt message by the mobile terminal may include stopping performing the preset function. For example, the preset function is the telephone function. In response to an incoming telephone call, the mobile terminal may automatically pick up the incoming call and the terminal may stop displaying incoming call information.

The present disclosure also provides a terminal for transmitting data information. Because the terminal adopts similar method of transmitting data information as previously described in the embodiments of the present disclosure, the description of the terminal will be streamlined and may refer to the corresponding description of the previously disclosed embodiments for related parts. The embodiments of the terminal described below are intended to be merely illustrative.

Figure 4:
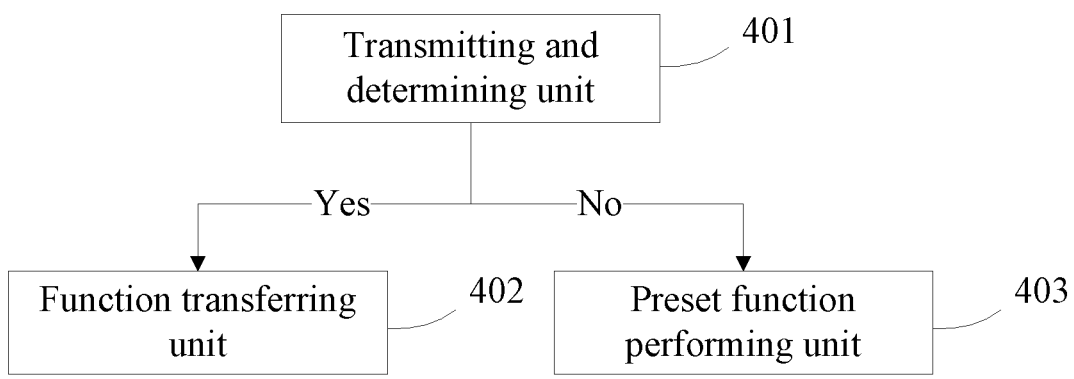
FIG. 4 illustrates a block diagram of an example of a terminal for transmitting data information according to some embodiments of the present disclosure.

FIG. 4 illustrates a block diagram of an example of a terminal for transmitting data information according to some embodiments of the present disclosure. As shown in FIG. 4, the present disclosure provides a terminal for transmitting data information. The terminal may include a transmitting and determining unit 401, a function transferring unit 402, and a function performing unit 403.

The transmitting and determining unit 401 determines whether information of a wireless power transmitting module of a terminal, obtained within a power transmission range by a wireless power receiving module, satisfies a preset condition. The function transferring unit 402 makes the terminal perform a preset function in response to the transmitting and determining unit 401 outputting a positive result. The preset function may include receiving and outputting a prompt message that is originally supposed to be outputted on a mobile terminal by the terminal. The function performing unit 403 outputs the prompt message in response to the transmitting and determining unit 401 outputting a negative result.

In the transmitting and determining unit 401, the information of the wireless power transmitting module of the terminal may include radio frequency information of the wireless power transmitting module of the terminal.

The function transferring unit 402 may include a data information transferring sub-unit. The data information transferring sub-unit transfers the data information of the preset function to the terminal that performs the preset function.

The data information transferring sub-unit may include a preset communication method sub-unit. The preset communication method sub-unit uses a preset communication method to transfer the data information of the preset function to the terminal.

The preset communication sub-unit may include a connection establishing sub-unit and a data transmitting sub-unit. The connection establishing sub-unit establishes a communication connection with the terminal according to the preset communication method. The data transmitting sub-unit uses the communication connection to transmit the data information of the preset function to the terminal.

The connection establishing sub-unit may include a secured connection sub-unit. The secured connection sub-unit establishes the communication connection to the terminal according to a preset secured communication method.

The data transmitting sub-unit may include a packetized information sub-unit and a packetized information transmitting sub-unit. The packetized information sub-unit packetizes the data information of the preset function to packetized information according to a preset packetization method. The packetized information transmitting sub-unit uses the communication connection to transmit the packetized information to the terminal.

In the packetized information sub-unit, the data information of the preset function may include streaming media information received in real-time.

When the terminal transfers a telephone function to the terminal, the streaming media information received in real-time may be voice information generated by answering a telephone call in real-time.

Further, the terminal may include a voice information transmitting sub-unit.

In particular, the voice information transmitting sub-unit may include a packetized information receiving sub-unit, a voice information restoring sub-unit, and a voice information transmitting sub-unit. The packetized information receiving sub-unit receives the packetized information generated by the terminal according to the preset packetization method. The voice information restoring sub-unit restores the packetized information to original voice information according to a preset depacketization method. The voice information transmitting sub-unit transmits the original voice information to a telephone call receiver according to certain protocol format of mobile communication.

It should be appreciated by those skilled in this art that the embodiments of the present disclosure may be provided in the form of a method, device (terminal, mobile terminal, apparatus, system) or computer program product. Therefore, the embodiments of the present disclosure may be realized by complete hardware embodiments, complete software embodiments, or software-hardware combined embodiments. Moreover, the present disclosure may be realized in the form of a computer program product that is applied to one or more computer-usable storage devices (including, but not limited to disk memory, CD-ROM or optical memory) in which computer-usable program codes are contained.

The present disclosure is illustrated with reference to the flow chart and/or the block diagrams of the method, device (apparatus, system) and computer program product according to the embodiments of the present disclosure. It should be appreciated that each flow in the flow chart and/or each block in the block diagram and/or the combination of the flows in the flow chart and the blocks in the block diagram may be realized by computer program instructions. These computer program instructions may be provided to a general-purpose computer, a special purpose computer, an embedded processor or processors of other programmable data processing devices to generate a machine which makes the instructions executed by the processors of the computers, or the processors of other programmable data processing devices generate a device for realizing the functions specified in one or more flows of the flow chart or one or more blocks in the block diagram.

It should be understood that actions described in various methods of the present disclosure may be carried out in order as shown, or alternately, in a different order. Therefore, the order of the actions illustrated should not be construed as limiting the scope of the present disclosure. In addition, certain actions may be performed simultaneously.

In various embodiments, the disclosed units/modules can be configured in one device or configured in multiple devices as desired. The units/modules disclosed herein can be integrated in one or multiple units/modules. Each of them can be divided into one or more sub-devices/devices, which can be recombined in any manner. In addition, the units/modules can be directly or indirectly coupled or otherwise communicated with each other, e.g., by suitable interfaces.

The coupling, or direct coupling, or communication connection between the disclosed components may use one or more interfaces. The indirect coupling or communication connection between units and/or modules may be electrically, mechanically or in other suitable manner.

These computer program instructions may also be stored in a computer-readable memory which is capable of guiding a computer or another programmable data processing device to work in a given manner, thereby enabling the instructions stored in the computer-readable memory to generate a product including an instruction device for realizing the functions specified in one or more flows of the flow chart or one or more blocks in the block diagram. In one embodiment, the computer-readable memory includes a non-transitory computer-readable storage medium.

The computer program instructions may also be loaded to a computer or other programmable data processing devices to execute a series of operations thereon to generate the processing realized by the computer so that the instructions executed by the computer or other programmable data processing devices offer the steps for realizing the functions specified in one or more flows of the flow chart or one or more blocks in the block diagram, e.g., as described in the present disclosure.

In the present disclosure, relational terms such as first and second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Various embodiments of the present specification are described in a progressive manner, in which each embodiment focusing on aspects different from other embodiments, and the same and similar parts of each embodiment may be referred to each other. Since the disclosed apparatus/device corresponds to the disclosed method, the description of the disclosed apparatus/device is made relatively simple, and may refer to the description of the methods in the present application.

The description of the disclosed embodiments is provided to illustrate the present disclosure to those skilled in the art. Various modifications to these embodiments will be readily apparent to those skilled in the art, and the generic principles defined herein may be applied to other embodiments without departing from the spirit or scope of the disclosure. Thus, the present invention is not intended to be limited to the embodiments shown herein but is to be accorded the widest scope consistent with the principles and inventive features disclosed herein.

What is claimed is:

1. A method, comprising:
   determining whether information of a wireless power receiving module of a mobile terminal, obtained within a power transmission range by a wireless power transmitting module of a computer, satisfies a preset condition;
   in response to the information of the wireless power receiving module satisfying the preset condition, taking over a communication function of the mobile terminal that requires a user interaction; and in response to the mobile terminal being out of the power transmission range of the computer, or in response to the information of the wireless power receiving module unsatisfying the preset condition, not taking over the communication function from the mobile terminal or transferring the communication function back to the mobile terminal.

2. The method according to claim 1, wherein the communication function includes:

establishing a communication connection to the mobile terminal according to a preset communication method; and using the communication connection to receive and output data information transmitted by the mobile terminal and related to the preset function.

3. The method according to claim 2, wherein establishing the communication connection to the mobile terminal according to the preset communication method includes:

establishing the communication connection to the mobile terminal according to a preset secured communication method.

4. The method according to claim 1, wherein the communication function includes one or more of:

playing voice information through a voice player module; and collecting voice information through a voice collection module.

5. The method according to claim 4, wherein collecting the voice information through the voice collection module includes:

generating packetized information by packetizing the voice information according to a preset packetization method; and using a communication connection to transmit the packetized information to the mobile terminal.

6. A terminal, comprising:

a wireless power transmitting module, wherein the terminal is configured for:

determining whether information of a wireless power receiving module of a mobile terminal, obtained within a power transmission range by the wireless power transmitting module of a computer, satisfies a preset condition;

in response to the information of the wireless power receiving module satisfying the preset condition, taking over a communication function of the mobile terminal that requires a user interaction, including receiving and outputting a prompt message that is originally supposed to be outputted on the mobile terminal; and in response to the terminal being out of the power transmission range of the computer, or in response to the information of the wireless power receiving module unsatisfying the preset condition, not taking over the communication function or transferring the communication function back to the terminal.

7. The terminal according to claim 6, wherein receiving and outputting the prompt message includes:

establishing a communication connection to the mobile terminal according to a preset communication method; and using the communication connection to receive and output data information transmitted by the mobile terminal and related to the preset function.

8. The terminal according to claim 7, wherein establishing the communication connection to the mobile terminal according to the preset communication method includes:

establishing the communication connection to the mobile terminal according to a preset secured communication method.

9. The terminal according to claim 6, wherein receiving and outputting the prompt message includes one or more of:

playing voice information through a voice player module; and collecting voice information through a voice collection module.

10. The terminal according to claim 9, wherein collecting the voice information through the voice collection module includes:

generating packetized information by packetizing the voice information according to a preset packetization method; and using a communication connection to transmit the packetized information to the mobile terminal.

* * * * *